US006273520B1

United States Patent
Liao

(10) Patent No.: US 6,273,520 B1
(45) Date of Patent: Aug. 14, 2001

(54) WHEEL SUPPORTER AND SHAFT FOR A GOLF CART

(75) Inventor: Gordon Liao, Yung Kang (TW)

(73) Assignee: Unique Product & Design Co., Ltd., Tainan Hsien (TW)

( * ) Notice: Subject to any disclaimer, the term of this patent is extended or adjusted under 35 U.S.C. 154(b) by 0 days.

(21) Appl. No.: 09/569,973

(22) Filed: May 11, 2000

Related U.S. Application Data

(63) Continuation-in-part of application No. 09/129,986, filed on Aug. 5, 1998, now abandoned.

(51) Int. Cl.⁷ ........................................... B60B 37/00
(52) U.S. Cl. .............................. 301/111; 301/119
(58) Field of Search ......................... 301/111, 112, 301/113, 121, 122, 125; 280/652, 654, DIG. 6

(56) References Cited

U.S. PATENT DOCUMENTS

| | | | |
|---|---|---|---|
| 4,978,175 | * 12/1990 | Wu | 301/111 |
| 5,529,385 | * 6/1996 | Tsao | 301/111 |
| 5,658,054 | * 8/1997 | Wu | 301/111 |
| 6,024,416 | * 2/2000 | Chen et al. | 301/111 |
| 6,120,106 | * 9/2000 | Liao | 301/120 X |
| 6,149,245 | * 11/2000 | Wu | 301/111 |
| 6,189,979 | * 2/2001 | Wu | 301/121 X |

* cited by examiner

*Primary Examiner*—Russell D. Stormer
(74) *Attorney, Agent, or Firm*—Pro-Techtor International Services

(57) ABSTRACT

A wheel supporter and shaft for a golf-cart includes a wheel shaft having an end portion protruding out of a wheel. The protruding end portion is formed with a recessed circumferential groove of a smaller size in an intermediate portion. The wheel supporter has a shaft hole for the wheel shaft to fit therein, and an eccentric push plate member is pivotally connected under a bottom wall of the shaft hole. The eccentric push member has a curved-up surface to protrude in the shaft hole to engage the recessed circumferential groove to lock the wheel shaft in a stabilized condition when the eccentric push member is pushed to rotate for a certain angle.

4 Claims, 4 Drawing Sheets

WHEEL SUPPORTER AND SHAFT FOR A GOLF CART

This present invention is a continuation-in-part of the application Ser. No. 09/129,986 filed on Aug. 5, 1998, entitled "Wheel Supporter And Shaft For A Golf Cart" now abandoned.

BACKGROUND OF THE INVENTION

This invention relates to a wheel supporter and shaft for a golf cart, particularly to one having a simple structure for easy assembly and collapsing.

Conventional gold carts are generally made collapsible, with a wheel supporter and a shaft capable to be collapsed and assembled by user so as to be easily carried or stored in a car trunk after collapsed.

A number of conventional wheel supporters and shafts are known as described below.

1. U.S. Pat. No. 4,978,175 has a complicated structure to manufacture and a limited direction in assembly, very inconvenient to use.

2. U.S. Pat. No. 5,529,385 has a stop plate 221 of an upper cover 22 to insert in the groove 121 of a wheel shaft 1, liable to loosen because of a point engagement with no tight effect.

3. U.S. Pat. No. 5,957,543 uses male and female threads to screw together for fixing, not only troublesome in assembly and disassembly, but the male and the female threads are prone to loosen owing to vibration in running of the wheels.

4. U.S. Pat. No. 5,658,054 has a lever 8 pivotally connected to the bottom end of a leg 6, which has a stop rod section 81 and a retainer rod section 82 respectively engaging a recessed bottom hole 711 and a bottom retaining groove 722. Its disadvantages are that (1) limited direction in assembling and the wheel shaft inserting in the locating hole 612 only in one direction make up inconvenience and trouble in assembly and disassembly, and that (2) the power direction of pulling the wheel outward are the same as the loosening direction of the lever 8, resulting in no self-locking function to let the retainer rod section 82 of the lever 8 loosen owing to rotation of the wheel 5.

SUMMARY OF THE INVENTION

The applicant have achieved two U.S. Pat. No. 5,029,946 and 5,466,051 regarding to the gold cart, but did not feel satisfied with them, and designed the present invention.

This invention has been devised to offer a wheel supporter and shaft for a golf cart, having a simpler structure than the conventional ones for easy assembly and disassembly.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
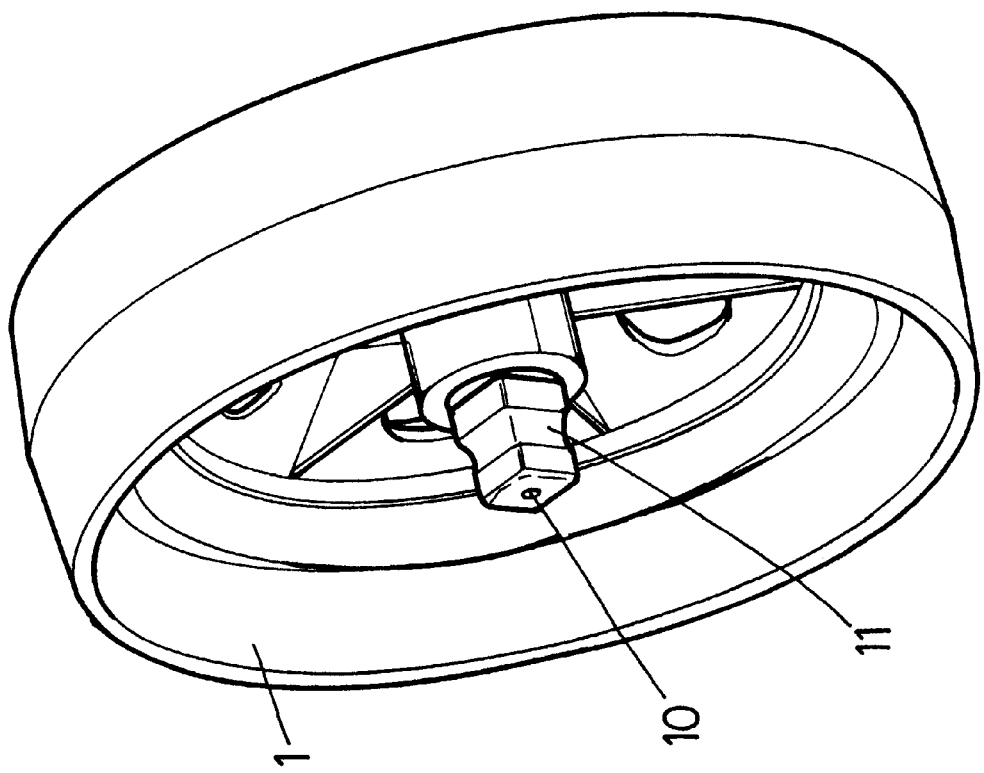
FIG. 1 is a perspective view of a wheel supporter separated from a wheel in the present invention.
Figure 1:
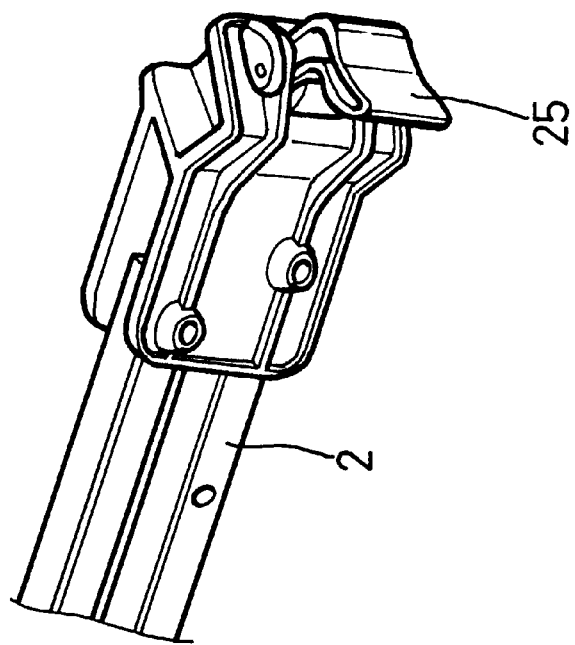
Figure 2:
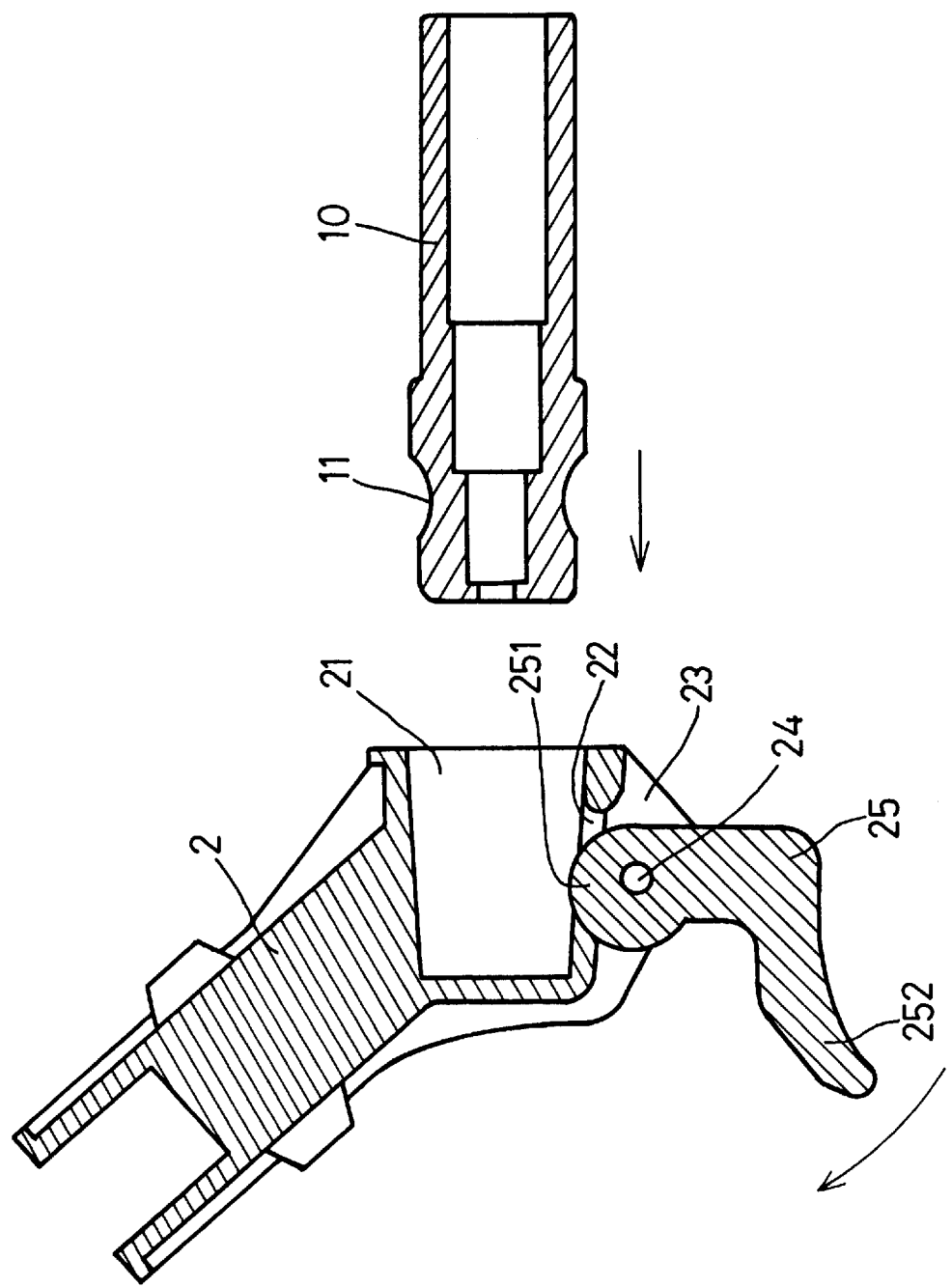
FIG. 2 is a cross-sectional view of the wheel supporter separated from the wheel in the present invention.

The preferred embodiment of a wheel supporter and shaft for a gold cart in the present invention, as shown in FIGS. 1 and 2, includes a wheel shaft 10 having a round end to fit firmly with a wheel 1 and the other end protruding out of a wheel 1 and shaped rectangular and having a recessed rectangular circumferential groove 11 of a smaller size than the rest portion. A wheel supporter 2 has a rectangular hole 21 formed in a lower end for the wheel shaft 10 to f therein, an aperture 22 formed in a bottom wall defining the hole 21, a projecting ear 23 formed respectively at two sides of the aperture 22 for pivotally connecting an eccentric push member 25 curved engage surface 251 able to insert through the aperture 22 into the hole 21 and a curved push means 252 extending down for a hand to push and pull.

Figure 3:
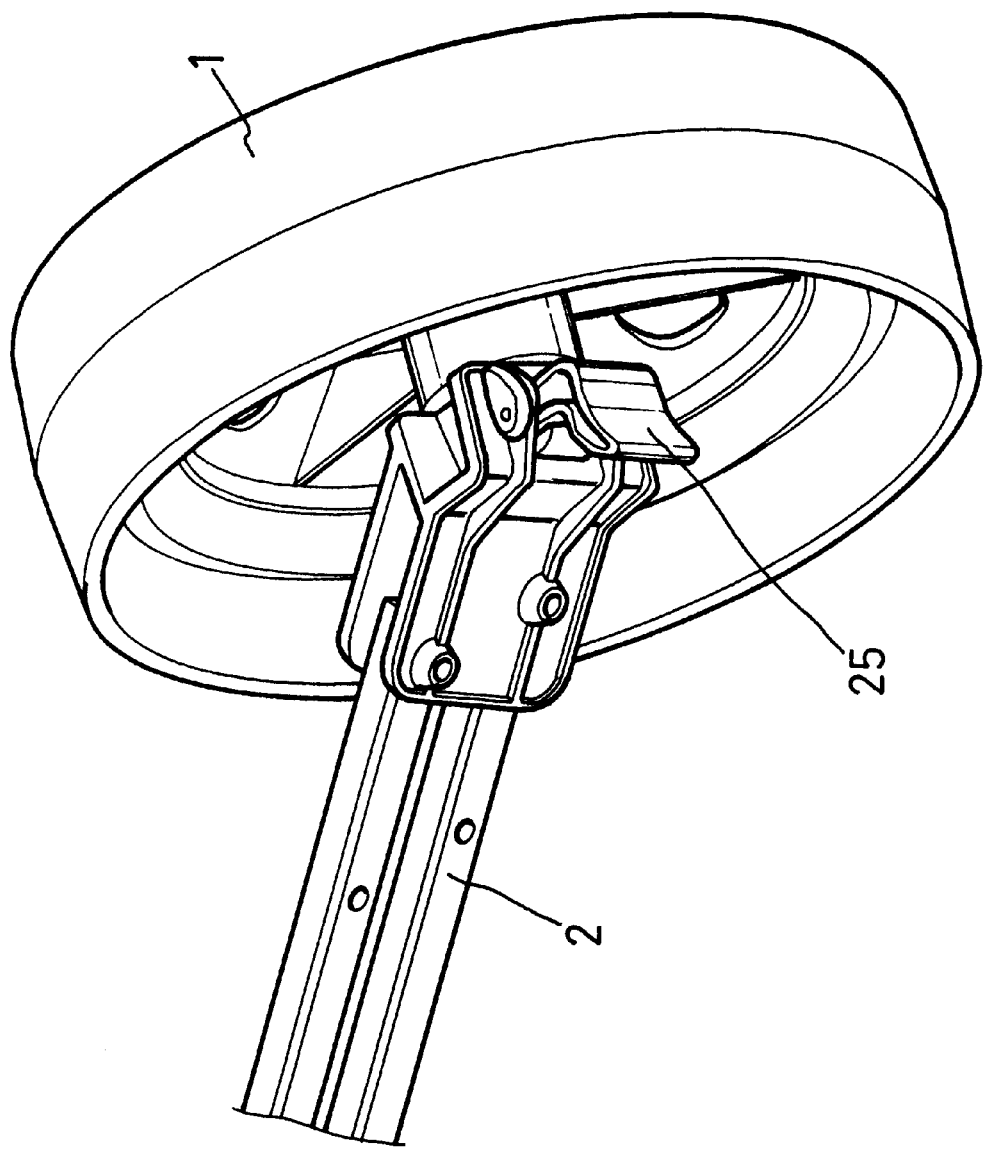
FIG. 3 is a perspective view of the wheel supporter and shaft combined with the wheel in the present invention: and, FIG. 4 is a cross-sectional view of the wheel supporter and shaft combined together in the present invention.

In assembling the wheel supporter 2 with the wheel shaft 10, firstly, insert the wheel shaft 10 together with the wheel 1 in the shaft hole 21 of the wheel supporter 2, with the recessed circumferential groove 11 just facing the aperture 22. Then pull backward the eccentric push member 25, forcing the curved engage surface 251 engage the recessed circumferential groove 11, locking the wheel supporter 2 with the wheel shaft 10 in the assembled condition, shown in FIGS. 3 and 4.

On the contrary, if the wheel supporter 2 is to be disengaged from the wheel shaft 10, only push swingingly down the eccentric push member 25, forcing the curved-up engage surface 251 disengage from the recessed circumferential groove 11, with the wheel shaft pulled out of the shaft hole 21, as shown in FIGS. 1 and 2.

It has to be noted that the protruding end portion of the wheel shaft 10 protruding out of the wheel 1 may gradually enlarged to the rear portion in corresponding to the hole 21 also gradually enlarged to the rear portion so that the wheel shaft 10 may easily fit in the shaft hole 21, so that the wheel shaft 10 may easily fit in the shaft hole 21, as shown in FIG. 2.

The invention has the following advantages, as can be understood from the aforesaid description.

1. Only the eccentric push member 25 is pivotally connected to the wheel supporter 2, enabling the wheel supporter 2 combine firmly together or separate from each other by pulling the eccentric push member 25, very simple in its structure, quick to assemble or disassemble.

2. The wheel shaft 10 protrudes out of the wheel 1 to push in or pull out of the hole 21 of the wheel supporter 2 in the same direction, facilitating the wheel shaft 10 to move in the hole 21, and the deeper it moves in, the tighter it may be, as shown in FIG. 2.

Figure 4:
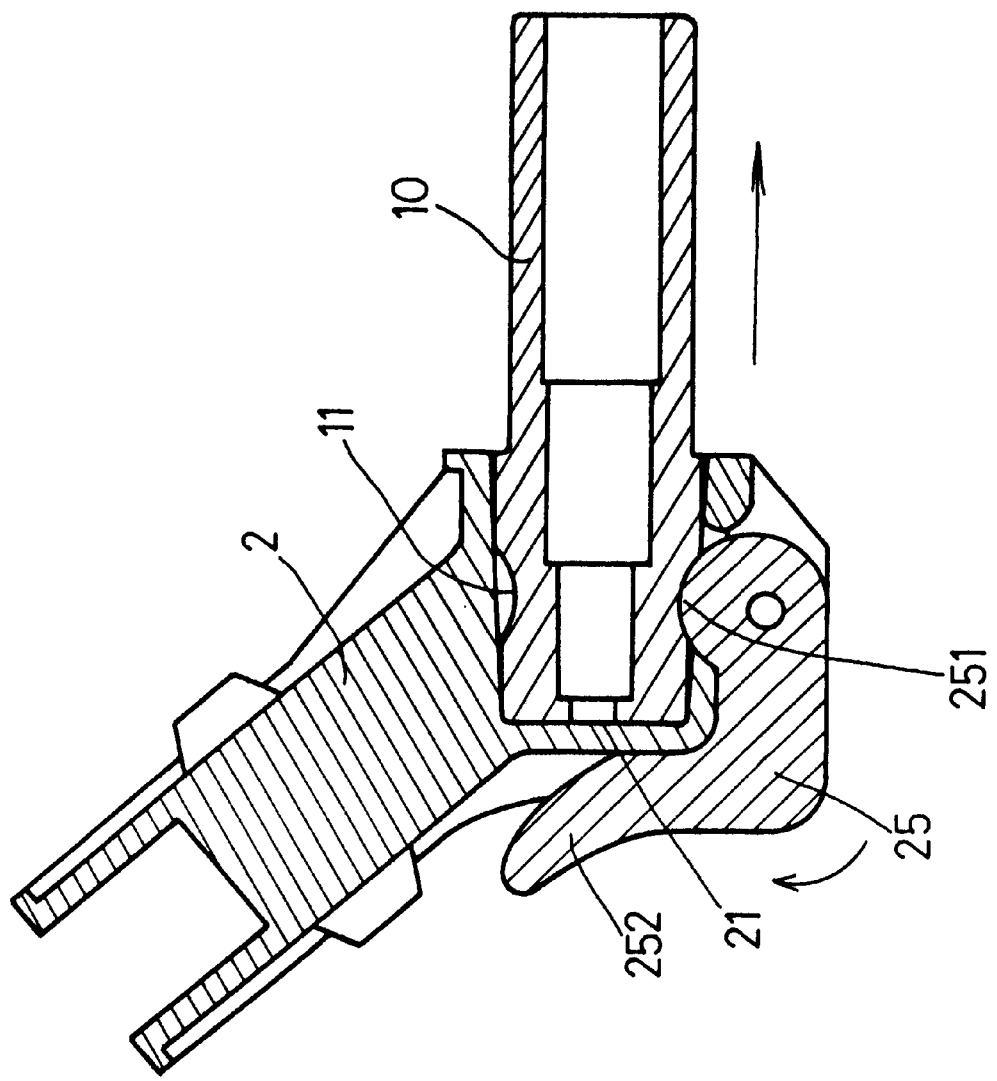

3. As shown in FIG. 4, the eccentric push member 25 has a curved-up engage surface 251 to engage the recessed rectangular circumferential groove 11 of the wheel shaft 10, forming a surface engagement to make comparatively stabilized combination. In addition, as the eccentric push member 25 overpasses the dead point (in other words, the center of the curved-up engage surface 251 passes the center of the recessed rectangular circumferential groove 11), achieving the best effect of combination stability and no loosening.

4. There is no limit in direction in assembly, very convenient and save time and accurate.

5. When the wheel produces outward pulling force in rotation, there produces self-locking function as shown in FIG. 4, with the force direction being contrary to the rotating direction after the eccentric push member 25 engages with it tightly, having a self-locking function, the more deeper, the tighter.

What is claimed is:

1. A wheel supporter and shaft for a golf cart comprising a wheel supporter and a wheel shaft, said wheel shaft having one end portion protruding out of a wheel, said protruding end portion being formed with a recessed circumferential groove, said wheel supporter having a shaft hole for said wheel shaft to fit therein, an eccentric engaging plate located under said shaft hole, said eccentric engaging plate having a curved-up surface formed in an upper end so that said engaging plate protrudes through an aperture in communication with said shaft hole to engage said recessed circumferential groove of said wheel shaft extending in said shaft hole so that said wheel supporter is locked with said wheel shaft.

2. The wheel supporter and shaft for a golf cart as claimed in claim 1, wherein said protruding end portion of said wheel shaft and said shaft hole of said wheel supporter are both rectangular in cross section.

3. The wheel supporter and shaft for a golf cart as claimed in claim 1, wherein said protruding end portion of said wheel shaft and said shaft hole of said wheel supporter are both tapered.

4. The wheel supporter and shaft for a golf cart as claimed in claim 1, wherein said eccentric engaging plate has a curved-up surface formed in an upper end and a curved push plate formed in a lower end portion for pushing and pulling.

* * * * *